United States Patent
Fiore et al.

[15] 3,648,181
[45] Mar. 7, 1972

[54] PULSE GENERATING CIRCUIT FOR PRODUCING PULSES OF AMPLITUDE WHICH IS A MULTIPLE OF THE AMPLITUDE OF THE SOURCE VOLTAGE

[72] Inventors: Anthony N. Fiore, Brighton; John D. McCarron, Dunstable, both of Mass.

[73] Assignee: Spacetac Incorporated, Bedford, Mass.

[22] Filed: Oct. 22, 1970

[21] Appl. No.: 82,977

[52] U.S. Cl.................................328/59, 307/109, 307/246, 307/260, 307/262, 307/264, 328/60, 328/62, 328/67
[51] Int. Cl..........................................H03k 1/00, H03k 3/02
[58] Field of Search...................307/228, 246, 236, 260, 262, 307/264, 106–110; 328/53, 59, 60, 61, 62, 67, 95–97, 118; 84/1.13, 1.26

[56] References Cited

UNITED STATES PATENTS

| | | | |
|---|---|---|---|
| 3,244,790 | 4/1966 | Sharp | 307/246 X |
| 3,247,306 | 4/1966 | Milho | 84/1.26 X |
| 3,407,260 | 10/1968 | Schrecongost | 84/1.26 |

*Primary Examiner*—Stanley D. Miller, Jr.
*Attorney*—Inadiorio & Grodberg, Joseph S. Iandiorio and Lester S. Grodberg

[57] ABSTRACT

A pulse generating circuit including charge storing means, unidirectional current flow means in series between a first terminal of the charge storing means and a common point; means, adapted for connection with a source of input voltage of predetermined voltage level in relation to the common point, for charging the charge storing means, first means for selectively connecting a second terminal of the charge storing means with the common point to drive the first terminal to a second predetermined voltage level equal to the first predetermined voltage level but opposite in polarity relative to the common point, output means, and second means for connecting to the output means the first predetermined voltage level when the first means for selectively connecting is opened and the second predetermined voltage level when the first means for selectively connecting is closed.

2 Claims, 5 Drawing Figures

ANTHONY N. FIORE, JR.
JOHN D. McCARRON
INVENTORS.

BY

Joseph S. Iandiorio
ATTORNEY.

ANTHONY N. FIORE, JR.
JOHN D. McCARRON
INVENTORS.

BY

Joseph S. Iandiorio
ATTORNEY.

PULSE GENERATING CIRCUIT FOR PRODUCING PULSES OF AMPLITUDE WHICH IS A MULTIPLE OF THE AMPLITUDE OF THE SOURCE VOLTAGE

FIELD OF INVENTION

This invention relates to a transformerless pulse generating circuit capable of producing a pulse whose amplitude is a multiple of the amplitude of the source voltage supplied to the circuit, and more particularly to such a pulse generating circuit, a pair of which may be used as a clock circuit in combination with a clock driver circuit for switching each of the pulse generating circuits in phased relationship to produce clock pulses which are in phased relation to each other which have an amplitude which is a multiple of the amplitude of the source voltage which combination of circuits is operated from a single voltage source.

BACKGROUND OF INVENTION

Metal oxide semiconductor (MOS) circuits inherently are of small size and require little power. Most digital MOS circuits require only a single DC supply voltage plus clock inputs. The necessary clock inputs may be supplied by a typical MOS clock circuit which provides the inherent advantages of MOS circuits but requires at least two DC voltage sources and operates at very high power levels. Typically, each of the driving signals to the MOS clock circuit and the DC inputs of the MOS clock circuit is derived from a separate power converter circuit, each of which may be driven from the same voltage source. Each of the power converters requires substantial power input and is relatively large because it includes one or more transformers. Thus, the inherent advantages of small size and low power of MOS circuits is obscured by the necessity for the power converters associated with the MOS clock circuits. Power converters are necessary to supply the inputs to the MOS clock circuit because, typically, the clock pulse outputs of that circuit operate at higher voltage levels than is provided by the voltage source for the system.

SUMMARY OF INVENTION

It is, therefore, an object of this invention to provide an improved pulse generating circuit capable of producing a pulse whose amplitude is a multiple of the amplitude of the source voltage supplied to it.

It is another object of this invention to provide such a pulse generating circuit, a pair of which may be used in combination with means for providing two phased signals in response to which the pulse generating circuits provide a pair of phased pulsed clock outputs.

It is another object of this invention to provide such a pulse generating circuit, a pair of which combined with means for providing two phased signals, results in a system which produces a pair of phased, pulsed clock inputs from a single voltage source.

The invention features a charge storing means and a unidirectional current flow means in series between the first terminal of the charge storing means and a common point. There are means adapted for connection with a source of input voltage of a predetermined voltage level in relation to the common point for charging the charge storing means. First means selectively connect the second terminal of the charge storing means with the common point to drive the first terminal to a second predetermined voltage level equal to the first predetermined voltage level but opposite in polarity relative to the common point. There are output means and second means for connecting to the output means the first predetermined voltage level when the first means for selectively connecting is opened and the second predetermined voltage level when the first means for selectively connecting is closed.

In preferred embodiments, such pulse generating circuits are used in combination with means for producing first and second phase signals. Each of the pulse generating circuits is responsive to one of those phase signals which operates the first and second means for selectively connecting.

DISCLOSURE OF PREFERRED EMBODIMENT

Other objects, features and advantages will occur from the following description of a preferred embodiment and the accompanying drawings, in which.

Figure 1:
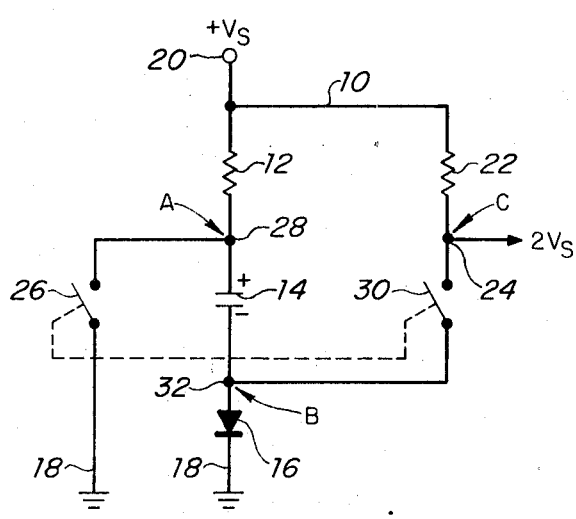
FIG. 1 is a schematic diagram of a pulse generating circuit according to this invention.

There is shown in FIG. 1 a pulse generating circuit 10 including a charging resistance 12, a charge storing medium, capacitance 14, and a diode 16, connected in series, between a common point, ground 18, and input terminal 20 which connects with a source of voltage $V_s$. Resistance 22 interconnects terminal 20 and output terminal 24; a first switch 26 interconnects the junction 28, between resistance 12 and capacitance 14, and ground 18, and a second switch 30 operable in conjunction with switch 26 interconnects output terminal 24 with junction 32 between capacitance 14 and diode 16.

Figure 2:
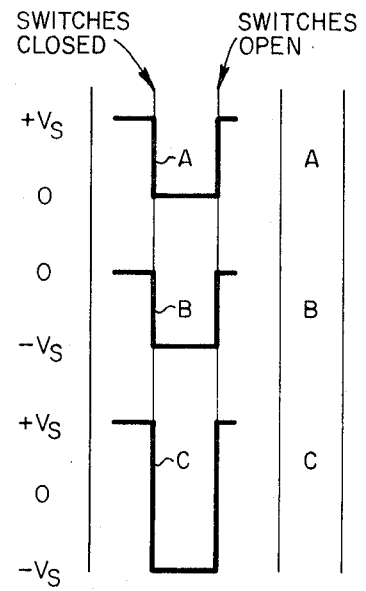
FIG. 2 is a chart showing waveforms occuring at particular points in the circuit of FIG. 1.

In operation, when input terminal 20 is connected to voltage $+V_s$, capacitance 14 charges through resistance 12 to the level of $+V_s$. Junction 28 is now at a level $+V_s$ relative to ground 18, and junction 32 is at ground 18. When switches 26 and 30 are closed, junction 28 is driven from $+V_s$ to ground 18, as is indicated by the waveform A, FIG. 2, which appears at junction 28. Since, however, the voltage across capacitance 14 is still $V_s$, junction 32 must now be at a level of $V_s$ below ground 18 or $-V_s$, as indicated by the waveform B, FIG. 2, which appears at junction 32. Since switch 30 is also closed, junction 32, now at $-V_s$, is connected to terminal 24. Before switches 26 and 30 were closed, terminal 24 was held at the voltage $+V_s$ through resistance 22. After switches 26 and 30 are closed, terminal 24 is connected to $-V_s$ at junction 32 by switch 30. Thus, a pulse having an amplitude of 2 $V_s$ is created as the voltage at terminal 24 decreases through the level of ground 18 to $-V_s$, as shown by waveform C depicted in FIG. 2. Pulse generating circuit 10 may be made to produce an output pulse at terminal 24 having an amplitude of other than twice the supply voltage $V_s$, such as $3V_s$, $4V_s$, $5V_s$, $KV_s$, by adding additional charge storing means in series with the output terminal 24 during charging and then connecting them in series with capacitance 14 when switches 26 and 30 are closed to provide the desired multiple of $V_s$. In addition, any such voltage provided at terminal 24 may be attenuated to whatever extent desired to produce other than integral multiples of $V_s$.

Figure 3:
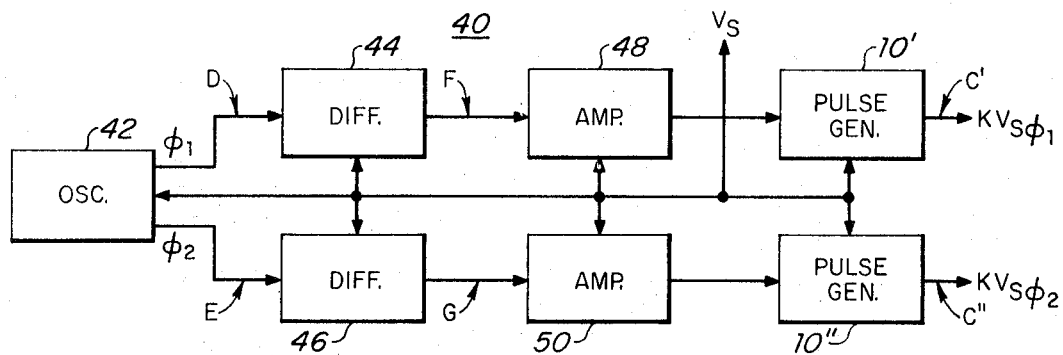
FIG. 3 is a block diagram of a clock circuit which employs two of the pulse generating circuits of FIG. 1 to produce, from a single voltage source, two phased clock pulses whose amplitude is a multiple of the voltage source.

The pulse generating circuit of FIG. 1 may be incorporated in an entirely MOS implemented system, such as clock system 40, FIG. 3, which from a single input from a voltage source $V_s$, provides two phased clocked pulse outputs which are a multiple of that source voltage $V_s$. Oscillator 42 provides two outputs which are 180° out of phase, wave forms D and E, FIG. 4, and two differentiators 44 and 46, which produce wave forms F and G, respectively, FIG. 4, that turn on amplifiers 48 and 50, respectively. Each time amplifier 48 is turned on, the negative-going spikes of waveform F actuate the switches in pulse generator 10' and produce a clock pulse of a first phase which is a multiple of $V_s$, wave form C', FIG. 4. Each time amplifier 50 is turned on by a negative spike of waveform G, the switches in pulse generator 10'' are actuated and produce a voltage of a second phase 180° out of phase with the first voltage and also a multiple of $V_s$, waveform C'', FIG. 4.

Various circuits and components may be used to perform the functions of oscillator 42, differentiators 44, 46 and amplifiers 48 and 50. For example, oscillator 42 which provides two, phased, output signals, waveforms D and E, may include a precision crystal oscillator or any other single phase output oscillator, combined with a flip-flop which, in response to the single phase output of the oscillator, will provide two signals 180° out of phase.

Figure 5:
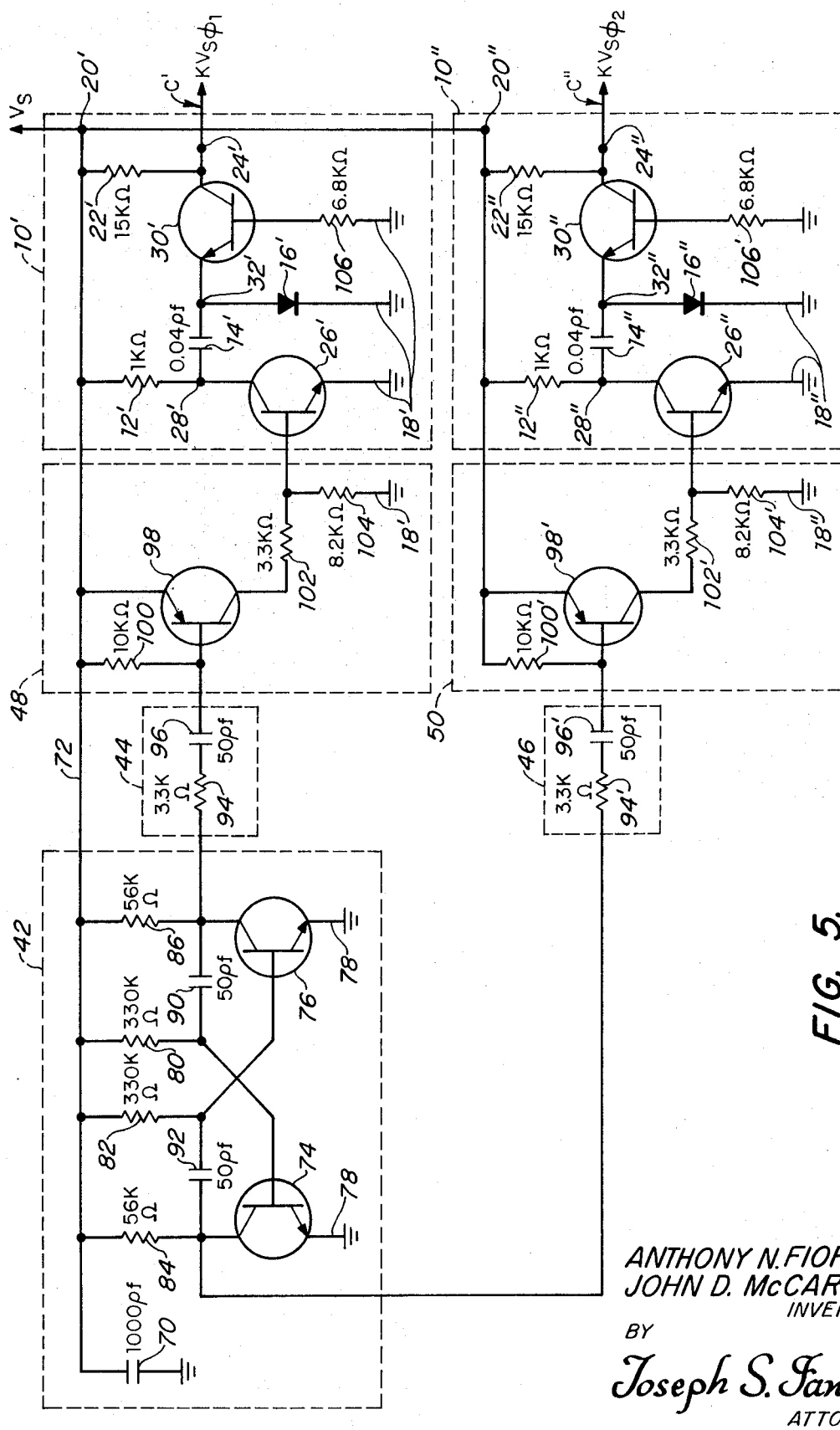
FIG. 5 is a more detailed schematic diagram showing one circuit implementation of the block diagram of FIG. 3.

One circuit implementation of the system of FIG. 3 is shown in FIG. 5. Throughout FIG. 5, legends accompanying each circuit element indicate their respective resistance and capacitance values. Oscillator 42 includes a capacitance 70 connected to the common bus 72 from input terminal 20' which connects to supply voltage $V_s$. A pair of transistors 74, 76 have their emitters connected to ground 78 and their bases connected to bus 72 through resistances 80 and 82, respectively. Their collectors are connected to bus 72 through resistances 84 and 86; resistances 80 and 86 are interconnected by a capacitance 90 and resistances 84 and 82 are interconnected to capacitance 92. The output from the collector of transistor 76 is fed directly into differentiator 44 which may include a resistance 94 and capacitance 96.

Figure 4:
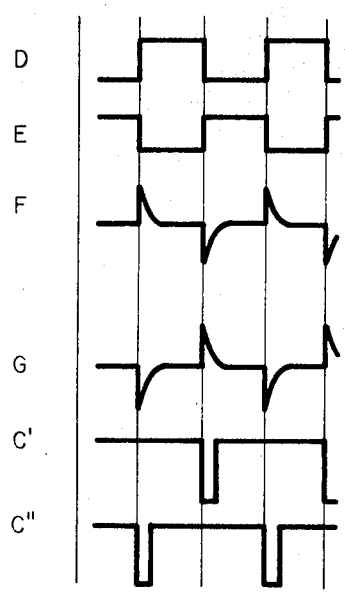
FIG. 4 is a chart showing wave forms occurring at particular points of the circuit of FIG. 3.

The output of differentiator 44 is fed directly to the base of transistor 98 which has its emitter connected to bus 72. A resistance 100 interconnects the base of transistor 78 with bus 72. The signal from the collector of transistor 98 passes through resistance 102 to pulse generating circuit 10' to close transistor 26' which is analogous to closing switch 26 in FIG. 1. Pulse generating circuit 10' is identical with pulse generating circuit 10 and like parts have been given like reference numerals primed. Resistance 104 interconnects the base of transistor 26' with ground 18'. The collector of transistor 26' connects with resistance 12' and capacitance 14' at junction 28'. The emitter of transistor 26' is connected to ground 18'. The other end of resistance 12' is connected to bus 72 and the other end of capacitance 14' is connected to junction 32'. Diode 16' interconnects junction 32' with ground 18'. The emitter of transistor 30', analogous to switch 30, FIG. 1, is connected to junction 32' and the base is connected to ground 18' through resistance 106. The collector of transistor 30' is connected through resistance 22' to bus 72 and is connected directly to terminal 24' where pulses as shown by wave form C', FIG. 4, are produced.

Similarly, the output from the collector of transistor 74 is oscillator 42, which is 180° out of phase with the output from the collector of transistor 76, is fed to differentiator 46, whose output is in turn fed to amplifier 50. The circuit elements of differentiator 46 and amplifier 50 are identical to those in differentiator 44 and amplifier 48, respectively, and have been indicated by like identical reference numbers primed. The output from the junction of resistors 102' and 104' is fed directly to pulse generating circuit 10" whose circuit elements are identical with those of pulse generating circuit 10' and are indicated by identical reference numbers with double primes.

Other embodiments will occur to those skilled in the art and are within the following claims.

What is claimed is;

1. A circuit for producing two phased output voltages from a single input voltage comprising:
    an input terminal adapted for connection to a source of predetermined voltage level;
    means, responsive to said voltage at said input terminal, for producing first and second phased signals;
    a first pulse generating circuit responsive to said first phased signal and a second pulse generating circuit responsive to said second phased signal for producing two phased output signals having a greater voltage level than said predetermined voltage level, each of said pulse generating circuits being responsive to said predetermined voltage level and including:
    charge storage means;
    unidirectional current flow means in series between a first terminal of said charge storing means and a common point;
    means, adapted for connection with a source of input voltage of predetermined voltage level relative to said common point, for charging said charge storage means;
    first means for selectively connecting a second terminal of said charge storing means with said common point to drive said first terminal to a second predetermined voltage level equal to said first predetermined voltage level but opposite in polarity relative to said common point;
    output means; and,
    second means for selectively connecting to said output means said first predetermined voltage level when said first means for selectively connecting is opened and said second predetermined voltage level when said first means for selectively connecting is closed.

2. The circuit of claim 1 in which said means for providing said first and second phases signals includes:
    oscillator means for producing first and second phased outputs;
    first and second differentiating means, responsive to said first and second phased outputs of said oscillator means for producing first and second phased trigger signals, respectively;
    first and second amplifier means responsive to said first and second trigger signals from said first and second differentiating means, for producing said first and second phased signals to said first and second pulse generating circuits.

* * * * *